UNITED STATES PATENT OFFICE.

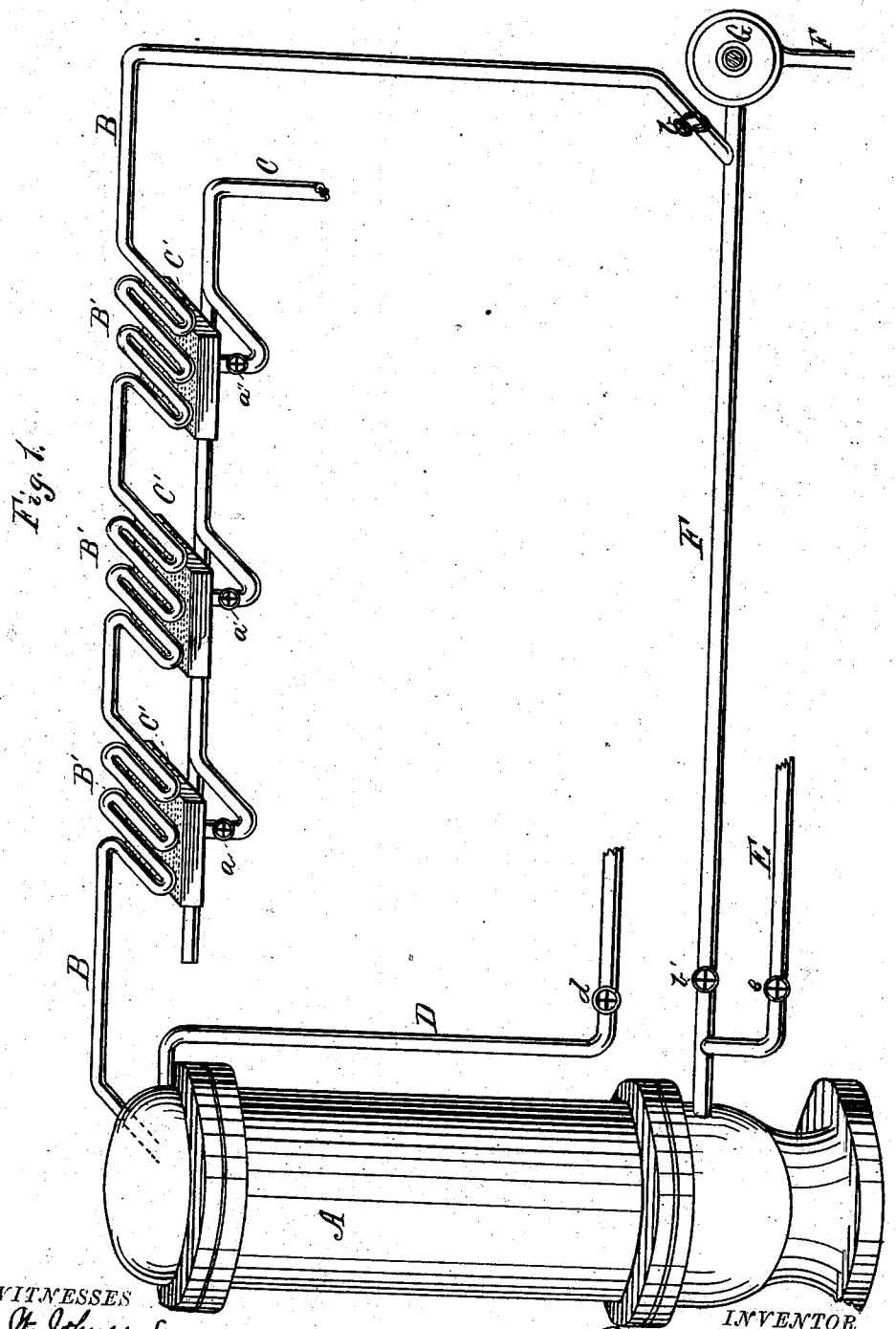

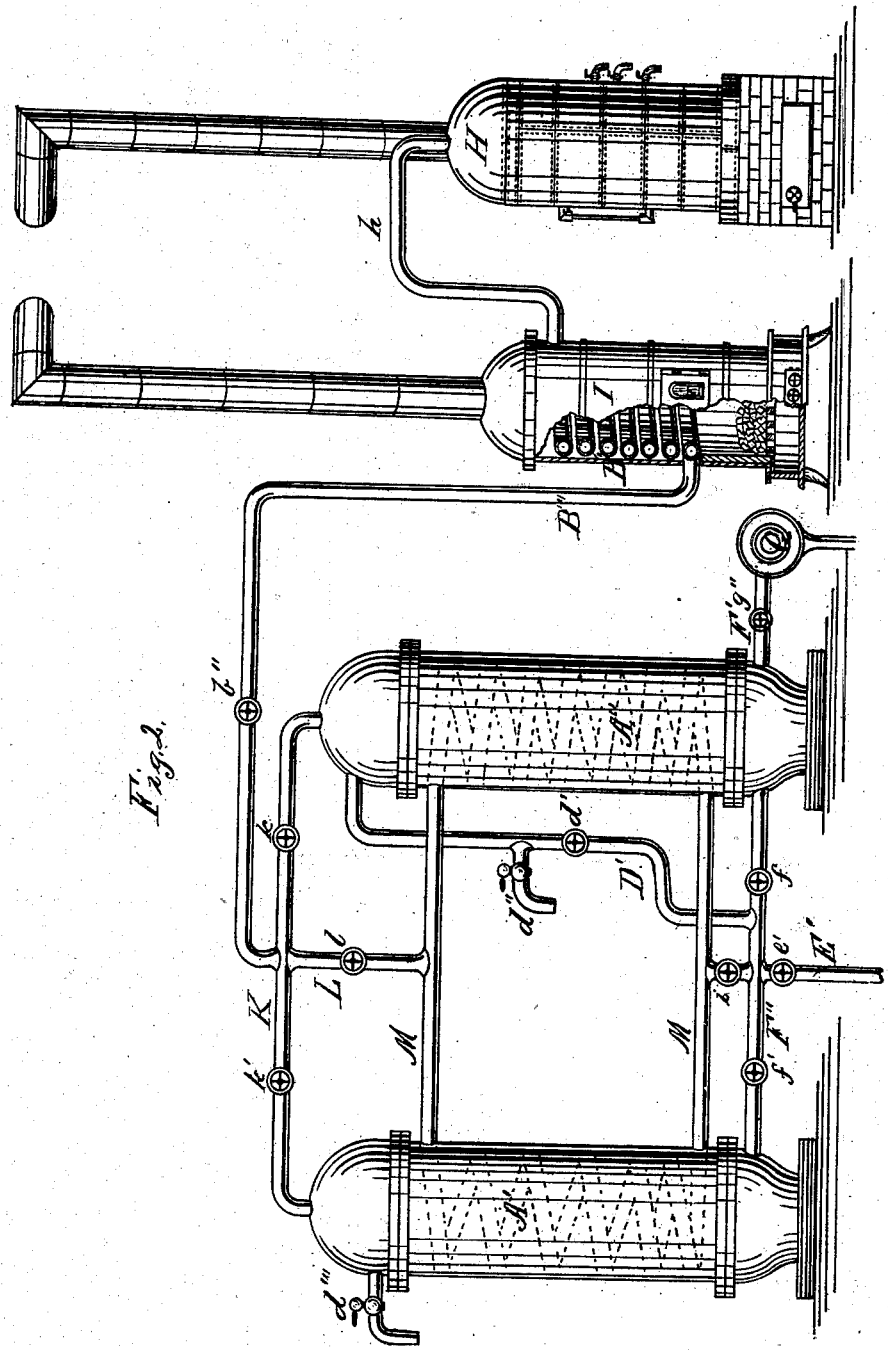

RALPH S. JENNINGS, OF BALTIMORE, MARYLAND.

APPARATUS FOR RECARBONIZING CHARCOAL IN FILTERS.

SPECIFICATION forming part of Letters Patent No. 239,962, dated April 12, 1881.

Application filed February 16, 1881. (Model.)

*To all whom it may concern:*

Be it known that I, RALPH S. JENNINGS, of Baltimore, in the State of Maryland, have invented a new and valuable Improvement in Apparatus for Recarbonizing Charcoal in Filters; and I do hereby declare that the following is a full, clear, and exact description of the construction and operation of the same, reference being had to the annexed drawings, making a part of this specification, and to the letters and figures of reference marked thereon.

Figure 1 of the drawings is a perspective view of my invention, and Fig. 2 is a modification of the same.

This invention relates principally to mechanical means for recarbonizing charcoal and other analogous substances in filters.

Heretofore charcoal has been revivified by placing the same in a vessel and forcing superheated steam through the mass of the charcoal in said vessel. My method differs from this in passing the superheated steam through the charcoal in the filter, thereby obviating the necessity of taking the filter apart and removing the charcoal to another vessel for revivification.

The importance of this method will be readily understood when it is known that these filters are used in houses and managed by servants who have not the intelligence, the will, or inclination to take apart a filter to remove the obstructions.

On the annexed drawings I have shown two ways in which my invention may be carried out, the method shown by Fig. 1 being intended more especially to be applied to filters which are intended for domestic purposes, the same means of producing the superheated steam and recarbonizing the charcoal being used to cleanse the filter from impurities which may have collected therein by a current of hot water forced through the filter in an opposite direction from which the liquid passes in the process of being filtered.

Fig. 2 of the annexed drawings shows the other method of carrying out my invention, in which I use a steam-boiler, a device for superheating the steam, and double filters, one of the filters being filled with animal charcoal and the other with vegetable charcoal, the filters being connected to each other in such a way that they can be used, cleansed, or the charcoal contained in the filters recarbonized, either together or independently, as desired.

A on the annexed drawings, Fig. 1, represents a filter, to which is connected the supply-pipe F, which may be provided with a force-pump, G. To the supply-pipe F is attached a waste-pipe, E, through which passes the accumulations of the filter when it is being cleansed. The pipe F is also connected to the pipe B, which is provided with a suitable number of coils or serpentine bends, B', under which are placed heating devices C', (preferably "Bunsen burners.") The pipe B is connected to the upper part of the filter.

D is a pipe for conducting the filtered liquid to the house or elsewhere, as may be desired.

When it is desirable to filter any liquid, the valve *b* on the pipe B is closed, as well as the valve *e* on the waste-pipe E, the other valves being open. The liquid to be filtered is forced through the pipe F by means of the pump G or other pressure, the liquid passing upward through the charcoal in the filter, and is discharged through the pipe D.

To cleanse the filter, the valve *b* on pipe B and valve *e* on pipe E are opened, the other ones being closed. The liquid is then forced through the pipe B and coils B', where it may be heated. It then enters the filter and passes through it in a downward direction, and passes out through the waste-pipe E, carrying with it the sediment which may have collected in the filter.

In filtering certain materials, among which are oils, wines, sugars, &c., the charcoal in the filter, after continual use, loses its filtering properties, and it becomes necessary to take the filter apart and repack it. To obviate repacking the filter I have provided this method of revivifying the charcoal and restoring its filtering properties without removing it from the filter. To recarbonize the charcoal the valves are arranged the same as when I desire to cleanse the filter by a reverse current of hot water, the valve *b* being only partly open, so as to prevent the full pressure of the water in the pipe B. The water is heated by the heating device C' in the first and second coils B', in which steam is generated, and in the last coil the steam is superheated, and passes through the charcoal and recarbonizes it. I have found by experiment that superheated steam has the same effect on charcoal in regard to recarbonizing and restoring its filtering properties as dry heat, and as there is nothing used in the construction of the filter which can be injured or destroyed by superheated steam, I may repeat the operation of renewing the filter by recarbonizing the charcoal as often as desired.

The method shown by Fig. 2 of the annexed drawings is intended more especially for manufacturing purposes; but its operation and effect is substantially the same as that shown by Fig. 1, and hereinbefore described.

In carrying out this modification of my invention I use a steam-boiler, a superheater, and double filters with double connections. The operation being substantially the same as that shown by Fig. 1 and previously described, I deem it only necessary to describe the construction and the process of recarbonizing the charcoal in the filters.

H is a steam-boiler of ordinary construction, to which is connected, by a pipe, $h$, a superheater, I, which is provided with a coil, B'', which is a part of the pipe B''', which pipe is provided with a valve, $b''$. The pipe B''' is attached to the connecting-pipe K, which enters the top of the filters A' A'', and is provided with valves $k$ $k'$. The pipe K is connected to the pipe M by the short pipe L, which is provided with the valve $l$.

The pipe M is coiled within the filters A' A'', and is connected to the waste-pipe E' by a short coupling and valve, $i$.

To the supply-pipe F' is attached a pump, G', which is used to force the liquid to be filtered through the packing in the filters A'' A'. Attached to the upper part of the filter A'' is the pipe D', with valve $d'$ and stop-cock $d''$. When desirable, the valve $d'$ may be closed and the stop-cock $d''$ opened. Thus, when desirable, I make use of only one filter. The pipe D', I also attach to the pipe F'', which is provided with valves $f f'$, and is connected to the waste-pipe E' with valve $e'$. The filter A' is provided at its upper part with an exhaust-pipe, through which the filtered liquid passes after having first passed through both filters, one of which I fill with vegetable charcoal and the other with animal charcoal. The exhaust-pipe is provided with a stop-cock, $d'''$.

In recarbonizing the charcoal in the filters I open the valves $b''$, $l$, $i$, and $e'$, and close the others, thereby letting the superheated steam into the coils in the filters A' A'', which coils are heated to such a degree by the superheated steam as to effectually recarbonize the charcoal in the filters.

I may also admit steam (which has not been superheated) to the coils in the filters, for the purpose of keeping them hot, when I desire to filter heavy bodies, such as oils, sugars, &c.

Superheated steam is admitted to either one or both of the filters for the purpose of recarbonizing the filling or cleansing them by opening the valves $k$ $k'$, $f f'$, and $e'$.

In filtering liquids I do not need to use the force-pump except in cases where the liquid is supplied to the filter without pressure.

I am aware that prior to my invention water and steam have been employed, and in some cases an acid has been added to revivify charcoal used in the filter; but experiments carried on by me have led me to believe that superheated steam or dry heat is the most successful method of revivifying charcoal in the filters.

What I claim as my invention, and desire to secure by Letters Patent, is—

1. The combination, substantially as hereinbefore described, of a filter containing charcoal, a steam-generating device, a superheater, and connecting-pipes, substantially as and for the purpose set forth.

2. The combination, with a filter containing charcoal, of a pipe, B, having a series of coils or serpentine bends, B', and heating devices, substantially as and for the purpose set forth.

3. The combination, with a filter containing charcoal, and provided with a supply-pipe, F, and discharge-pipe D, of the pipe B, having a series of coils or serpentine bends, B', and the heating devices C', substantially as and for the purpose set forth.

In testimony that I claim the above I have hereunto subscribed my name in the presence of two witnesses.

RALPH S. JENNINGS.

Witnesses:
EUGENE W. JOHNSON,
B. G. HARRIS.